US009061931B2

(12) United States Patent
Ellison et al.

(10) Patent No.: US 9,061,931 B2
(45) Date of Patent: Jun. 23, 2015

(54) METHODS FOR REDUCING ZIRCONIA DEFECTS IN GLASS SHEETS

(71) Applicant: Corning Incorporated, Corning, NY (US)

(72) Inventors: Adam James Ellison, Corning, NY (US); Timothy James Kiczenski, Corning, NY (US); John Christopher Mauro, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 14/264,251

(22) Filed: Apr. 29, 2014

(65) Prior Publication Data
US 2014/0230490 A1 Aug. 21, 2014

Related U.S. Application Data

(62) Division of application No. 13/417,750, filed on Mar. 12, 2012, now Pat. No. 8,746,010.

(51) Int. Cl.
C03B 17/06 (2006.01)
C03C 21/00 (2006.01)

(52) U.S. Cl.
CPC .............. *C03B 17/064* (2013.01); *C03C 21/00* (2013.01); *C03C 21/002* (2013.01)

(58) Field of Classification Search
CPC ...... C03B 17/064; C03B 17/06; C03C 3/093; C03C 2204/00
USPC ............................................. 65/90–99.1, 373
See application file for complete search history.

(56) References Cited

U.S. PATENT DOCUMENTS

| 3,338,696 | A | 8/1967 | Dockerty ........................ 65/145 |
| 3,682,609 | A | 8/1972 | Dockerty .......................... 65/83 |
| 6,183,829 | B1 * | 2/2001 | Daecher et al. .............. 428/64.1 |
| 8,211,505 | B2 * | 7/2012 | Bocko et al. .................. 427/420 |
| 8,359,887 | B2 * | 1/2013 | Bisson et al. .................. 65/101 |
| 8,666,705 | B2 | 3/2014 | Allan et al. ....................... 703/2 |
| 2003/0121287 | A1 * | 7/2003 | Chalk et al. ....................... 65/90 |
| 2007/0149380 | A1 * | 6/2007 | Dorfeld et al. .................. 501/55 |
| 2008/0282736 | A1 | 11/2008 | Filippov et al. .................... 65/90 |

(Continued)

FOREIGN PATENT DOCUMENTS

WO 2009/011792 1/2009

OTHER PUBLICATIONS

J.C. Mauro, et al., "Viscosity of glass-forming liquids", *Proc. Nat. Acad. Sci.*, Nov. 24, 2009, vol. 106, No. 47, pp. 19780-19784.
Veytizou, et al., "Zircon formation from amorphous silica and tetragonal zirconia: kinetic study and modelling", *Solid State Ionics*, 2001, vol. 139, pp. 315-323.
PCT/US2013/029510, Filed Mar. 7, 2013, PCT Search Report and Written Opinion.

*Primary Examiner* — Jodi C Franklin
(74) *Attorney, Agent, or Firm* — Ryan T. Hardee

(57) ABSTRACT

Methods are disclosed for treating zircon-containing forming structures, e.g., zircon isopipes, with one or more treatment glass compositions in which defect-causing reactions between the zircon of the forming structure and molten glass are suppressed at the delivery temperature of the treatment glass. The treatment compositions can be used during start-up of a forming structure, between runs of the same production glass on a given forming structure, and/or when transitioning between runs of two production glasses on a given forming structure. The treatment compositions can be used with production glasses that are ion-exchangeable.

17 Claims, 3 Drawing Sheets

(56) References Cited

U.S. PATENT DOCUMENTS

| | | | |
|---|---|---|---|
| 2009/0162545 A1* | 6/2009 | Bocko et al. | 427/209 |
| 2009/0217705 A1* | 9/2009 | Filippov et al. | 65/99.1 |
| 2009/0314032 A1 | 12/2009 | Tomamoto et al. | 65/29.14 |
| 2010/0093510 A1* | 4/2010 | Tanaka et al. | 501/32 |
| 2010/0173766 A1* | 7/2010 | Cornelius et al. | 501/66 |
| 2010/0281921 A1* | 11/2010 | Bisson et al. | 65/101 |
| 2011/0045961 A1* | 2/2011 | Dejneka et al. | 501/66 |
| 2011/0120191 A1* | 5/2011 | DeLamielleure et al. | 65/29.21 |
| 2013/0065748 A1* | 3/2013 | Koyama et al. | 501/67 |
| 2013/0233019 A1* | 9/2013 | Ellison et al. | 65/30.14 |

* cited by examiner

METHODS FOR REDUCING ZIRCONIA DEFECTS IN GLASS SHEETS

CROSS-REFERENCE TO RELATED APPLICATIONS

This is a divisional of U.S. patent application Ser. No. 13/417,750 filed on Mar. 12, 2012, the content of which is relied upon and incorporated herein by reference in its entirety, and the benefit of priority under 35 U.S.C. §120 is hereby claimed.

FIELD

This disclosure relates to the methods for making glass sheets, e.g., the glass sheets employed in the manufacture of scratch-resistant faceplates for portable electronic devices, and, in particular, to methods for reducing zirconia defects in such sheets.

DEFINITIONS

The term "glasses" (as well as its singular form, "glass") includes both glasses and glass-ceramics.

The phrase "zircon-containing forming structure" refers to a forming structure that has an outer surface at least a part of which (i) is composed of zircon and (ii) comes into contact with molten glass during use of the forming structure.

The word "isopipe" refers generically to a body having a configuration suitable for use as a forming structure in an overflow, downdraw, fusion process, irrespective of the particular shape and construction of the body or whether formation of the body involves isopressing or not.

When numerical ranges are set forth in the specification or claims, the ranges include their end points.

BACKGROUND

A. The Fusion Process

The overflow, downdraw, fusion process (also known as the "fusion draw process," the "downdraw fusion process," or, simply, the "fusion process") is a successful industrial technique for the large-scale manufacture of thin glass sheets. Compared to other flat glass manufacturing techniques, such as the float or slot draw processes, the fusion draw process yields thin glass sheets with superior flatness and surface quality. As a result, the process has become a dominant manufacturing technique in the fabrication of thin glass substrates for liquid crystal displays, as well as cover glass for personal electronic devices.

The fusion draw process involves the flow of molten glass over a forming structure known as an "isopipe," which is made of zircon or another refractory material. The molten glass overflows the top of the isopipe from both sides, meeting at the bottom of the isopipe to form a single sheet where only the interior of the final sheet has made direct contact with the isopipe. Since neither exposed surface of the final glass sheet has made contact with the isopipe material during the draw process, both surfaces of the glass are of pristine quality and do not require subsequent finishing.

Discussions of the fusion draw process can be found in, for example, commonly-assigned U.S. Pat. Nos. 3,338,696 and 3,682,609, to Stuart M. Dockerty, the contents of which are incorporated herein by reference. A schematic drawing of an exemplary glass manufacturing system 100 that uses the fusion draw process to make glass sheets 15 is shown in FIG. 1.

As shown therein, the glass manufacturing system 100 includes a melting vessel 110, a fining vessel 115, a mixing vessel 120 (e.g., stir chamber 120), a delivery vessel 125 (e.g., bowl 125), a fusion draw machine (FDM) 141 and a traveling anvil machine (TAM) 150.

The melting vessel 110 is where the glass batch materials are introduced as shown by arrow 112 and melted to form molten glass 126. The fining vessel 115 (e.g., finer tube 115) has a high temperature processing area that receives the molten glass 126 (not shown at this point in FIG. 1) from the melting vessel 110 and in which bubbles are removed from the molten glass 126. The fining vessel 115 is connected to the mixing vessel 120 (e.g., stir chamber 120) by a finer to stir chamber connecting tube 122, and the mixing vessel 120 is connected to the delivery vessel 125 by a stir chamber to bowl connecting tube 127.

The delivery vessel 125 delivers the molten glass 126 through a downcomer 130 into the FDM 141 which includes an inlet 132, an isopipe 135, and a pull roll assembly 140. As shown, the molten glass 126 from the downcomer 130 flows into inlet pipe 132, through opening 136 in the side of isopipe 135, and then into the isopipe's trough 137. The molten glass overflows the top of trough 137 (i.e., it overflows the trough's weirs) and runs down the two sides 138a and 138b of the isopipe before fusing together at what is known as the root 139. In particular, the root 139 is where the two sides 138a and 138b of the isopipe come together and where the two overflowing sheets of molten glass 126 join together to form glass ribbon 11 which is drawn downward by the pull roll assembly 140.

The pull roll assembly 140 delivers the drawn glass ribbon 11 to scoring/separating assembly 150 (e.g., a traveling anvil machine or TAM), which can, for example, include a nosing device and a scoring device (e.g., a scoring wheel) for producing a score line across the glass ribbon. After scoring, the glass ribbon 11 is bent about the score line so as to separate an individual glass sheet from the ribbon (see sheet 15 below scoring/separating assembly 150 in FIG. 1).

B. Ion-Exchangeable Glasses

Ion-exchangeable glasses are used to produce chemically-strengthened glass articles, also known as ion-strengthened glass articles. Examples of ion-strengthened glass articles include the scratch-resistant faceplates used in portable electronic devices, e.g., the faceplates made from Corning Incorporated's Gorilla® brand glass sheets. In overview, such articles are made by forming an ion-exchangeable glass into a desired configuration, e.g., into a glass sheet in the case of faceplates, and then subjecting the formed glass to an ion-exchange treatment, e.g., a treatment in which the formed glass is submersed in a salt bath at an elevated temperature for a predetermined period of time.

The ion-exchange treatment causes ions from the salt bath, e.g., potassium ions, to diffuse into the glass while ions from the glass, e.g., sodium ions, diffuse out of the glass. Because of their different ionic radii, this exchange of ions between the glass and the salt bath results in the formation of a compressive layer at the surface of the glass which enhances the glass's mechanical properties, e.g., its surface hardness. The effects of the ion exchange process are typically characterized in terms of two parameters: (1) the chemical depth of layer (DOL) produced by the process and (2) the final maximum surface compressive stress (CS). Values for these parameters are most conveniently determined using optical measurements, and commercial equipment is available for this purpose, e.g., the stress meters sold by Orihara Industrial Company, Ltd.

Although highly-valued for their ability to produce chip and scratch resistant glass surfaces, ion-exchangeable glass compositions have been observed to generate defects in the interior of glass sheets as a result of reactions with isopipe materials. In particular, molten ion-exchangeable glasses may react with zircon to produce zirconia inclusions in a final glass product, a defect known as "fusion line zirconia." Such defects, if large enough, can compromise the integrity of the final glass product and hence lead to failure to pass quality inspection. Such reactions between the molten glass and the isopipe material may thereby cause a reduction in the yield of the fusion draw process and are thus undesirable.

Accordingly, a need exists in the art for methods for reducing zirconia defects in glass sheets produced using forming structures, e.g., isopipes, composed in whole or in part of zircon. The present disclosure addresses this need.

SUMMARY

In accordance with a first aspect, a treatment process is disclosed for treating a forming structure in preparation for producing glass sheets from molten glass having a production composition, the forming structure having an outer surface at least a part of which is composed of zircon and comes into contact with the molten glass during use of the forming structure, the treatment process including:

(A) melting batch materials to produce molten glass having a treatment composition, said batch materials comprising silica; and (B) delivering the molten glass having the treatment composition to the forming structure at a delivery temperature $T_{delivery/treatment}$;

wherein:

(i) at $T_{delivery/treatment}$, the treatment composition promotes the reaction:

$$ZrO_2 + SiO_2 \rightarrow ZrSiO_4; \text{ and}$$

(ii) the treatment process reduces the level of zirconia defects in glass sheets produced from the production composition using the forming structure (i.e., it reduces the level of zirconia defects compared to the level that would exist if the treatment had not been performed).

In accordance with a second aspect, a method is disclosed for producing glass sheets from molten glass using a forming structure that has an outer surface at least a part of which is composed of zircon and comes into contact with the molten glass during use of the forming structure, the method including in order:

(A) melting batch materials to produce molten glass having a treatment composition, the batch materials comprising silica;

(B) delivering the molten glass having the treatment composition to the forming structure at a delivery temperature $T_{delivery/treatment}$;

(C) melting batch materials to produce molten glass having a production composition;

(D) delivering the molten glass having the production composition to the forming structure;

(E) using the forming structure to produce a glass ribbon; and (F) separating glass sheets from the ribbon produced in step (E), the glass sheets having the production composition;

wherein at $T_{delivery/treatment}$, the treatment composition promotes the reaction:

$$ZrO_2 + SiO_2 \rightarrow ZrSiO_4.$$

In accordance with a third aspect, a method is disclosed for producing glass sheets from molten glass using a forming structure that has an outer surface at least a part of which is composed of zircon and comes into contact with the molten glass during use of the forming structure, the method including in order:

(A) melting batch materials to produce molten glass having a first production composition;

(B) delivering the molten glass having the first production composition to the forming structure;

(C) using the forming structure to produce a glass ribbon;

(D) separating glass sheets from the ribbon produced in step (C), the glass sheets having the first production composition;

(E) melting batch materials to produce molten glass having a treatment composition, the batch materials comprising silica;

(F) delivering the molten glass having the treatment composition to the forming structure at a delivery temperature $T_{delivery/treatment}$;

(G) melting batch materials to produce molten glass having a second production composition;

(H) delivering the molten glass having the second production composition to the forming structure;

(I) using the forming structure to produce a glass ribbon; and (J) separating glass sheets from the ribbon produced in step (I), the glass sheets having the second production composition;

wherein at $T_{delivery}$/treatment, the treatment composition promotes the reaction:

$$ZrO_2 + SiO_2 \rightarrow ZrSiO_4.$$

In an embodiment of the third aspect, the first and second production compositions can be the same.

The above summaries of the various aspects of the disclosure are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as exemplified by the description herein. The accompanying drawings are included to provide a further understanding of the invention, and are incorporated in and constitute a part of this specification.

It is to be understood that the various features of the invention disclosed in this specification and in the drawings can be used in any and all combinations. For example, the subject matter of the claims that depend from independent Claim 1 is also applicable to independent Claims 18 and 19.

(1) (horizontal axis in ° C.) versus measured zircon breakdown temperatures (vertical axis in ° C.) obtained using XRF (diamond data points) or wet chemistry ("x" data points). Results are shown for 86 glass compositions.

Figure 3:
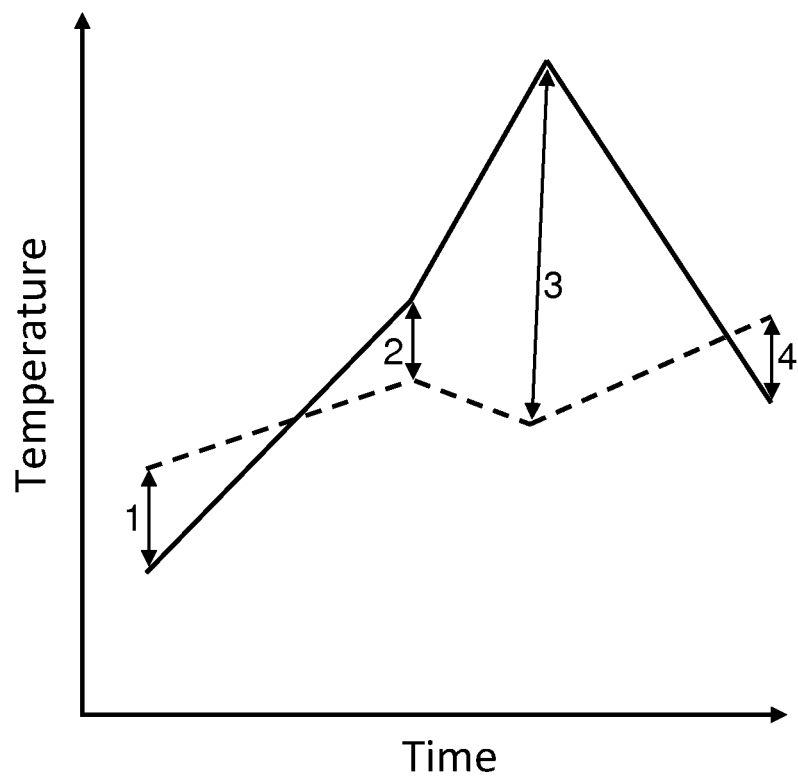

FIG. 3 is a schematic diagram illustrating the use of two treatment glass compositions to transition between a first ion-exchangeable glass composition and a second ion-exchangeable glass composition. The horizontal axis in this figure shows time (full scale on the order of, for example, one to two months) and the vertical axis shows temperature (full scale from, for example, 1100° C. to 1300° C.). The dashed line in this figure shows delivery temperature ($T_{delivery}$) and the sold line shows zircon breakdown temperature ($T_{brkdwn}$). By having the breakdown temperature (solid line) substantially higher than the delivery temperature (dashed line), the reaction pathway is $ZrO_2 + SiO_2 \rightarrow ZrSiO_4$, thereby substantially clearing the system of fusion line zirconia defects.

DETAILED DESCRIPTION

As discussed above, the present disclosure is concerned with methods for reducing zirconia defects in glass sheets that arise from reactions of molten glass with forming structures (e.g., isopipes) composed in whole or in part of zircon, i.e., reactions of molten glass with zircon-containing forming structures. Although particularly beneficial when used with zircon isopipes employed in a fusion draw process, the cleaning techniques disclosed herein can generally be used with any process which employs a zircon-containing forming structure where the zircon comes into contact with molten glass during use of the forming structure.

The reaction between molten glass and a zircon-containing forming structure is a strong function of temperature and thus a "zircon breakdown temperature" ($T_{brkdwn}$) can be defined above which the reaction of zircon with molten glass becomes sufficiently favorable that the resulting zirconia defect level is commercially unacceptable. In an embodiment, $T_{brkdwn}$ is defined as the temperature at which more than 0.01 zirconia defects per pound of glass are observed at the fusion line of glass sheets made by a fusion process. Numerical values for $T_{brkdwn}$ can be obtained experimentally or using Eq. (1) discussed below.

The zircon breakdown temperature is a function of the composition of the molten glass. Thus, a glass composition having a high reactivity with zircon will have a low zircon breakdown temperature, while a more inert glass composition will have a high zircon breakdown temperature. The zircon breakdown temperature for any particular glass composition will have a corresponding viscosity, referred to herein as the "zircon breakdown viscosity."

Figure 1:
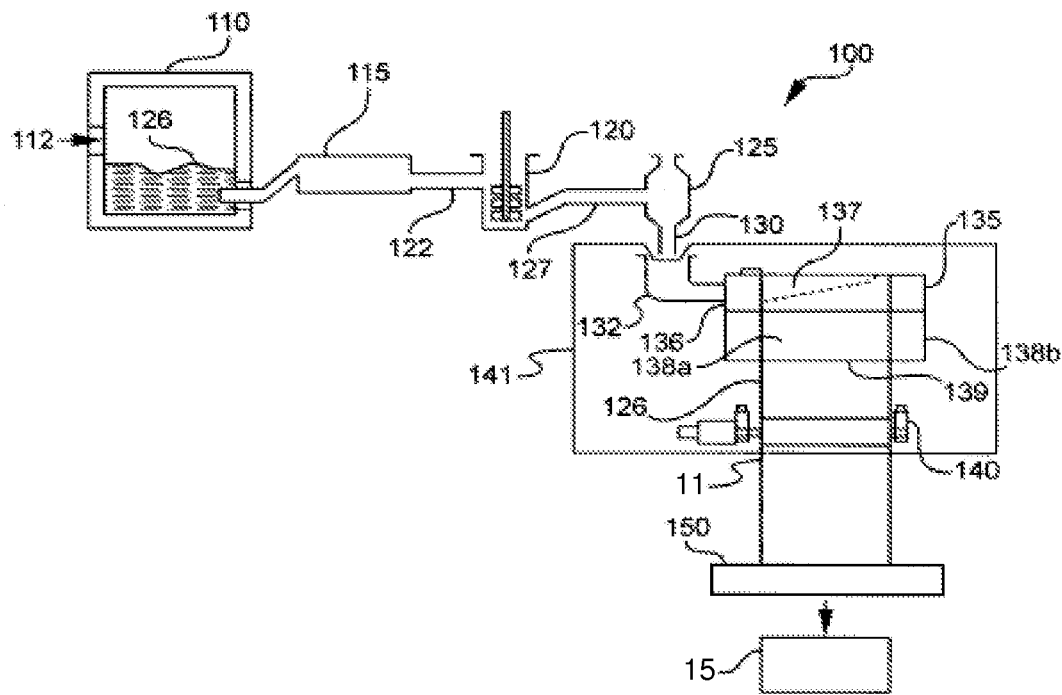
FIG. 1 is a schematic view of an exemplary, prior art, glass manufacturing system which employs the fusion process.
Figure 2:
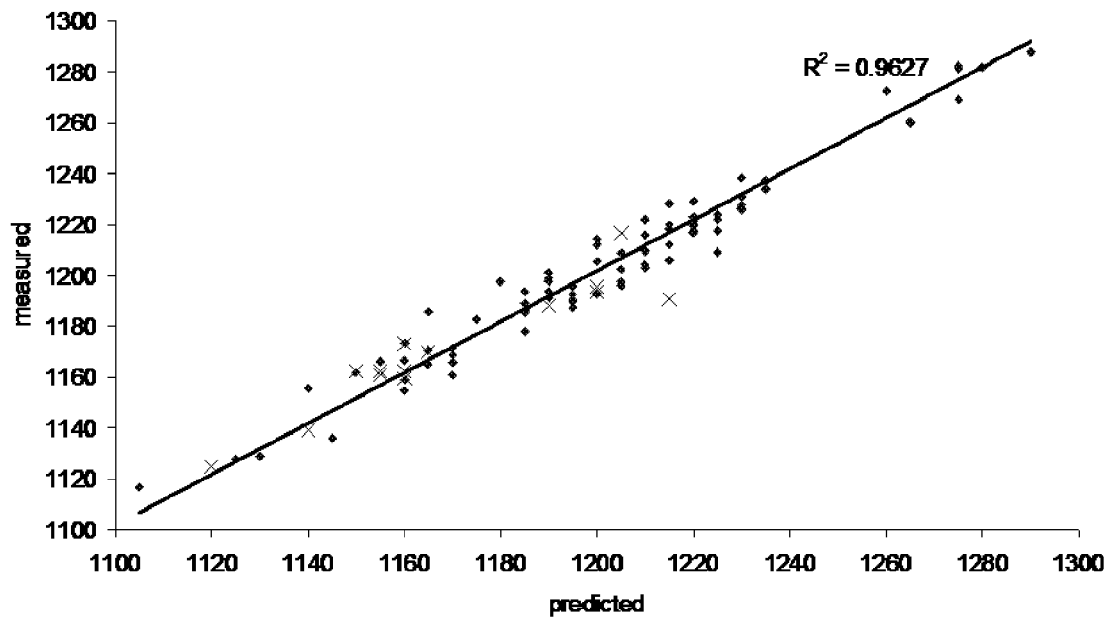
FIG. 2 is a plot of predicted zircon breakdown temperatures obtained using the computer-implemented model of Eq.

Both the zircon breakdown temperature and the corresponding zircon breakdown viscosity can be experimentally measured for any given glass composition. However, in selecting glass compositions for use as treatment glasses, significant cost and time savings can be achieved by selecting batch materials at least in part based on computer-implemented models. In accordance with an embodiment, it has been found that for ion-exchangeable glasses, the zircon breakdown temperature (as defined above) can be modeled by an equation of the form:

$$T_{brkdwn} = T_{b0} + \Sigma x_i Z_i \quad (1)$$

where the symbols $x_i$ are mole % oxide components except $SiO_2$. The parameters $T_{b0}$ (the intercept) and $Z_i$ are fitting parameters chosen to optimize agreement with measured zircon breakdown temperatures over a range of experimental data, e.g., a range where the viscosity of the glass composition is above the viscosity needed for successful forming with an isopipe (see below). An example of measured data and model prediction is shown in FIG. 2.

In accordance with an embodiment, glass viscosities (e.g., the viscosity of the glass at $T_{brkdwn}$) can be estimated/predicted using computer-implemented models of the type disclosed in commonly-assigned U.S. application Ser. No. 12/896,355, entitled "Methods and Apparatus for Predicting Glass Properties," which was filed on Oct. 1, 2010, the content of which is incorporated herein in its entirety by reference. In outline, that application discloses a method for determining a relationship between temperature T and viscosity η for a material that (i) is a glass or glass-forming liquid and (ii) includes N viscosity-affecting components, which includes the steps of:

(a) measuring the viscosity of a plurality of reference materials at a plurality of temperatures; and (b) using a programmed computer, fitting a function of the form $$\log_{10} \eta(T,x) = C_1 + C_2 \cdot (f_1(x, FC1)/T) \cdot \exp([f_2(x, FC2) - 1] \cdot [f_1(x, FC1)/T - 1]) \quad (2)$$

to the measured viscosities of step (a) to determine values for FC1 and FC2, where in said function:

(i) $C_1$ and $C_2$ are constants, (ii) $x = \{x_1, x_2, \ldots x_i \ldots x_N\}$ are the concentrations of the N viscosity-affecting components, (iii) $FC1 = \{FC^1_1, FC^1_2 \ldots FC^1_i \ldots FC^1_N\}$ is a first set of temperature-independent coefficients, one coefficient for each of the N viscosity-affecting components, and (iv) $FC2 = \{FC^2_1, FC^2_2 \ldots FC^2_i \ldots FC^2_N\}$ is a second set of temperature-independent coefficients, one coefficient for each of the N viscosity-affecting components, where the function and the values for FC1 and FC2 determined in step (b) constitute the relationship between viscosity and temperature for the material. Further details regarding this method for predicting viscosity-versus-temperature profiles can be found in the above-referenced application. Other viscosity-versus-temperature models can, of course, be used in the practice of the present disclosure if desired, e.g., the conventional Fulcher equation approach can be used. If desired, a viscosity at a particular temperature can, of course, be experimentally measured.

In addition to the zircon breakdown viscosity (referred to herein as $\eta_{brkdwn}$), another important viscosity that needs to be considered in connection with reducing zirconia defects is the viscosity at which molten glass needs to be delivered to the forming structure (referred to herein as $\eta_{delivery}$). As a representative value for a fusion process using an isopipe, $\eta_{delivery}$ is on the order of 30-40 kPoise. As with the $\{T_{brkdwn}, \eta_{brkdwn}\}$ pair, $\eta_{delivery}$ has a corresponding $T_{delivery}$ which can, for example, be determined experimentally or using a computer-implemented model, e.g., the model of Eq. (2) above.

To minimize the level of zirconia defects in the final glass product, $T_{brkdwn}$ should be above $T_{delivery}$, i.e., the molten glass should be delivered to the zircon-containing forming structure at a temperature below that at which the reaction from zircon to zirconia becomes favorable. (In terms of viscosity, this means that the breakdown viscosity should be less than the delivery viscosity.) However, depending on the requirements for the final glass product, this is not always possible and even when possible, the difference between $T_{brkdwn}$ and $T_{delivery}$ may be too small to ensure low levels of zirconia defects over, for example, long product runs.

In accordance with the present disclosure, this problem is addressed through the use of glass compositions that operate to condition (recondition) zircon-containing forming structures (referred to herein as "treatment compositions"). As discussed in more detail below, these compositions promote the reaction $ZrO_2+SiO_2 \rightarrow ZrSiO_4$, and thus reduce the probability of high levels of zirconia defects.

Three cases for using treatment compositions can be considered: (1) start-up of a forming structure; (2) on-going operation of a forming structure with a particular glass composition; and (3) on-going operation of a forming structure with a transition from a first glass composition to a second glass composition.

In the first case, pre-use conditioning of the forming structure with one or more treatment glass compositions will ensure low levels of zirconia on the glass-engaging surfaces of the forming structure prior to the introduction of the glass composition for the desired product. Such pre-use conditioning can be of particular value for glass compositions that have a tendency to generate zirconia defects at the delivery temperature being used (hereinafter referred to as "zirconia-generating compositions"). By having a "clean" starting surface, longer runs become possible prior to the onset of commercially unacceptable defect levels when running such compositions at such delivery temperatures.

The second case will typically arise in connection with the production of products from zirconia-generating compositions. Sooner or later such compositions will convert enough zircon to zirconia so as to produce unacceptably high levels of zirconia defects in the final product. At such times, the forming structure can be reconditioned with one or more treatment compositions so as to clean the forming structure and thus allow it to again be used to make the desired product.

The third case is similar to the second case but instead of returning to the original product after the use of the one or more treatment compositions, a transition is made to a new product. In such as case, either or both of the first and second glass compositions can be zirconia-generating compositions. As an alternative, neither composition need be a zirconia-generating composition but because a transition is desired, and will be performed in any event, one or more treatment compositions may be used because of their suitability as transition compositions (see below).

It should be noted that the third case can arise quite frequently in high-tech industries, such as, the flat-glass industry, where new commercial glass compositions are frequently developed to offer advantages in the final properties compared to previous glass compositions. Thus, a glass making machine must often be converted from producing one type of glass to a new glass of a different composition. Historically, such changes have involved shutting down the process and draining the melting and other vessels completely, followed by restarting the process directly with the new glass composition. However, this process is time-consuming and expensive. In accordance with the third case, this need for compositional changes in the glass products produced by any particular manufacturing line can actually serve as an opportunity to condition/recondition the forming structure and thus reduce the level of zirconia defects in glass sheets made from the changed composition. Thus, through embodiments of the technology disclosed herein, a "win-win" situation can be achieved wherein both levels of zirconia defects in glass sheets are reduced and disruptions to on-going industrial production of such sheets are minimized.

In addition to the considerations relating to zirconia defects, in an embodiment, the one or more treatment compositions are selected so as to accommodate rate-related limitations associated with changing batch compositions and/or operating parameters of a glass making machine. The relevant factors are the rates of change of: (i) glass density, (ii) concentrations of batch components, and (iii) delivery temperature.

The concern in the case of density change is the possibility of stratification of the molten glass at one or more points in the overall process. Once stratification occurs, it can be difficult to eliminate without a complete shutdown and rebuild of the glass making machine. Stratification manifests itself as off-spec glass as the higher density glass, which has accumulated at one or more low points in the system, leaches into the lower density glass flowing above it.

The limitation on the rate of change of the concentrations of batch components arises from the fact that to avoid damage to the vessel used to melt the batch components (the melter), batch materials are continuously added to the melter at a rate that substantially matches the rate at which glass sheets are being formed. In this way, the volume of molten glass in the melter remains substantially constant. As a result, glass compositions change in a steady manner over time from an existing composition to a new composition, rather than in a step-like manner. In particular, the composition changes progressively as newly-added batch materials mix with the molten glass in the melter and become an increasing fraction of the content of the molten glass leaving the melter. This mixing effect can set a floor on the maximum rate at which a composition can be changed for any particular glass melting line, e.g., even if there are no stratification problems or delivery temperature issues (see below), a finite amount of time will be required to change compositions because of the mixing effect in the melter.

The limitation on the rate of change of delivery temperature relates to the fact that the delivery viscosity often needs to be held substantially constant over time so as to avoid an upset to the glass forming process. To hold viscosity substantially constant as the composition changes typically requires a change in the temperature at which the molten glass is provided to the forming structure, i.e., a change in the delivery temperature. Larger delivery temperature changes will, in general, take longer and will be more risky than smaller changes. Accordingly, as with density changes, the rate at which delivery temperatures are changed in connection with the use of a treatment composition often needs to be limited so as not to generate undesirable side effects from the treatment procedure.

In an embodiment, treatment compositions are used which are selected to minimize the amount of time consumed in treatment (or, more generally, the time involved in transition from one glass composition to another) by taking into account (i) the maximum allowable rate of density change, (ii) the maximum allowable rate of change in the concentration of each raw material, and (iii) the maximum allowable rate of change in the delivery temperature. The selection of the treatment compositions also takes into account the liquidus and breakdown behaviors of the full set of glasses involved, including the product glasses and the treatment glasses. Given these factors, as well as the sensitivity of the fusion draw process to changes, in an embodiment, a transition path is chosen that simultaneously minimizes defects and minimizes the time of the transition to the final glass composition.

In an embodiment, the treatment compositions are designed so that at least one of the following criteria is met:
(1) the magnitude of the change in density between each treatment composition and the composition after it (whether another treatment composition or a product composition) is less than or equal to 0.1 g/cm$^3$ (e.g., less than or equal to 0.05 g/cm$^3$);

(2) the magnitude of the change in density between each treatment composition and the composition before it (whether another treatment composition or a product composition) is less than or equal to 0.1 g/cm$^3$ (e.g., less than or equal to 0.05 g/cm$^3$);

(3) the magnitude of the largest change in concentration of any batch component between each treatment composition and the composition after it (whether another treatment composition or a product composition) is less than or equal to 5 mole percent (e.g., less than or equal to 3 mole percent);

(4) the magnitude of the largest change in concentration of any batch component between each treatment composition and the composition before it (whether another treatment composition or a product composition) is less than or equal to 5 mole percent (e.g., less than or equal to 3 mole percent;

(5) the magnitude of the change in $T_{delivery}$ between each treatment composition and the composition after it (whether another treatment composition or a product composition) is less than or equal to 100° C. (e.g., less than or equal to 50° C.);

(6) the magnitude of the change in $T_{delivery}$ between each treatment composition and the composition before it (whether another treatment composition or a product composition) is less than or equal to 100° C. (e.g., less than or equal to 50° C.).

In an embodiment, more than one of the foregoing criteria are met. In an embodiment, all of the foregoing criteria are met.

In an embodiment, it is desirable to ensure proper melting behavior of the one or more treatment glasses, as well as the continuum of glasses between the starting glass, the one or more treatment glasses, and the final glass. That is, all of these glasses desirably have sufficiently low melting temperatures, e.g., melting temperatures (200 poise temperatures) equal to or less than 1750° C., or equal to or less than 1700° C. Likewise, the glasses desirably have sufficiently high liquidus viscosities for processing by, for example, the fusion process, e.g., liquidus viscosities equal to or greater than 100 kPoise, or equal to or greater than 300 kPoise, or equal to or greater than 500 kPoise.

In an embodiment, in order to reduce the costs associated with the treatment process (or, more generally, any glass transition), it is desirable that one, some, or all of the one or more treatment glasses (transition glasses) be saleable. For the case of ion-exchange glasses, this means that the glasses should offer sufficiently high compressive stress at a desired depth-of-layer after an ion-exchange treatment, e.g., a compressive stress equal to or greater than 750 MPa at a depth-of-layer of 50 microns, where both the compressive stress and the depth-of-layer are determined optically, e.g., using a stress meter of the type sold by Orihara Industrial Company, Ltd. Hence, in accordance with this embodiment, the customer requirements for the final product attributes, such as ion-exchange performance, are part of the design process used to select treatment composition(s) (transition composition(s)).

In an embodiment, the one or more treatment glasses (transition glasses) are designed to be usable with multiple pairs of production glasses so as to permit standardization of treatment/transition procedures.

FIG. 3 is a schematic diagram illustrating a representative time course for a transition between a first product composition and a second product composition using a plurality of treatment compositions (specifically, two treatment compositions), where the treatment compositions are designed to "clean" the forming structure and thus reduce the likelihood of high levels of zirconia defects in glass sheets produced from the second product composition. In this figure, the dashed and solid lines show, respectively, the delivery and zircon breakdown temperatures of the glass.

The left-hand and right-hand ends of the curves (see reference numbers 1 and 4) show the delivery temperature (dashed line) and zircon breakdown temperature (solid line) of the first and second product compositions, respectively. As can be seen, in each case, the delivery temperature (dashed line) is greater than the breakdown temperature (solid line), which means that both compositions will have a tendency to generate zirconia defects. At the left-hand ends of the curves (see reference number 1), a transition is made to a first treatment composition whose breakdown temperature (solid line) is greater than its delivery temperature (dashed line). As discussed above, transitions between compositions are not step functions, but rather take place over a period of time. In FIG. 3, this transition-over-time is represented by a linear increase in the breakdown temperature (solid line), as well as a linear increase in the delivery temperature (dashed line), the slope of the breakdown temperature line being greater than that of the delivery temperature line so that by the time the glass composition being delivered to the forming structure has substantially completely transitioned to the first treatment composition (see reference number 2), the breakdown temperature (solid line) will be greater than the delivery temperature (dashed line). (It should be noted that the linear changes in breakdown and delivery temperatures with time are only for purposes of illustration and, in practice, the changes need not and, in general, will not be linear over time.)

At reference number 2 in FIG. 3, a transition is begun between the first treatment composition and a second treatment composition. As illustrated in this figure, the second treatment composition has an even greater difference between its breakdown temperature (solid line) and its delivery temperature (dashed line) than that of the first treatment composition, so that by the time the transition to the second composition is completed (see reference number 3 in FIG. 3), the difference between these two temperatures (i.e., $\Delta_{brkdwn-delivery} = T_{brkdwn} - T_{delivery}$) is substantial, as is desired to achieve a high level of cleaning. (Note that again the transition to the second treatment composition is shown as proceeding linearly with time in FIG. 3 solely for purposes of illustration).

At reference number 3 in FIG. 3, the transition to the second product composition is begun, with the transition being complete at reference number 4. As noted above, the second product composition has a delivery temperature (dashed line) that is greater than its zircon breakdown temperature (solid line), so that as the transition proceeds, the breakdown temperature drops and the delivery temperature increases, i.e., $\Delta_{brkdwn-delivery}$ goes from being strongly positive to somewhat negative. Again, this transition is shown as taking place linearly over time solely for purposes of illustration.

Quantitatively, in an embodiment, it is desirable to use at least one treatment glass having a positive delta between its breakdown temperature and its delivery temperature, e.g., in an embodiment, having a $\Delta T_{brkdwn-delivery}$ that is greater than or equal to 5° C., or greater than or equal to 25° C., or greater than or equal to 50° C. In this way, the amount of time needed to "clean" a forming structure can be reduced. In an embodiment, all of the treatment compositions used will have a $\Delta T_{brkdwn-delivery}$ greater than zero, e.g., in an embodiment, all of the treatment compositions will have a $\Delta T_{brkdwn-delivery}$ greater than or equal to 5° C., or greater than or equal to 25°

C., or greater than or equal to 50° C. These $\Delta T_{brkdwn\text{-}delivery}$ values have corresponding viscosity deltas, with the delivery viscosity being greater than the breakdown viscosity. For a delivery viscosity in the range of 30-40 kPoise, in an embodiment $\Delta \eta_{delivery\text{-}brkdwn}$ is greater than or equal to 3 kPoise for at least one of the one or more treatment compositions used to condition (recondition) a forming structure, or greater than or equal to 5 kPoise, or greater than or equal to 10 kPoise, or greater than or equal to 20 kPoise. In an embodiment, for a delivery viscosity in the range of 30-40 kPoise, $\Delta \eta_{delivery\text{-}brkdwn}$ is greater than or equal to 3 kPoise for all of the one or more treatment compositions, or greater than or equal to 5 kPoise, or greater than or equal to 10 kPoise, or greater than equal to 20 kPoise.

A variety of treatment compositions can be used in the practice of the technology disclosed herein. Table 1 sets forth components and exemplary mole percentage ranges for treatment compositions that can be used with product compositions that are ion-exchangeable. In these treatment compositions, the various components can serve the following purposes.

Silica, or $SiO_2$, is the primary glass forming oxide, and forms the network backbone for the molten glass. From the perspective of zircon breakdown behavior, pure $SiO_2$ is non-reactive with zircon-containing forming structures. Indeed, the reaction of zircon to produce fusion line zirconia may be written as

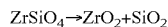

$$ZrSiO_4 \rightarrow ZrO_2 + SiO_2$$

Clearly the presence of $SiO_2$ is favorable to drive the reaction in the leftward direction, i.e., promoting the formation of zircon ($ZrSiO_4$). However, the presence of any other oxide compromises the zircon breakdown performance and may eventually promote the formation of fusion line zirconia ($ZrO_2$) defects (see below).

Pure $SiO_2$, however, is incompatible with the fusion draw process owing to its extremely high melting temperature. Since the viscosity of pure $SiO_2$ or high-$SiO_2$ glasses is too high in the melting region, defects such as fining bubbles may appear, and erosion of refractories and degradation of platinum may become too extreme to permit long-term manufacturing in a continuous process. Furthermore, as silica concentration increases, the liquidus temperature may increase due to increasing stability of cristobalite, a crystalline polymorph of $SiO_2$ that is an undesirable devitrification phase in a continuous process. Compared to every oxide except boron oxide ($B_2O_3$), $SiO_2$ decreases density and coefficient of thermal expansion, and relative to $B_2O_3$ it improves durability. In an embodiment, the $SiO_2$ content of a treatment glass is between 68 and 72 mol %.

Aluminum oxide, or $Al_2O_3$, also serves as a glass former. Like $SiO_2$, it contributes viscosity due to its tetrahedral coordination in the glass melt. When carefully balanced against $SiO_2$ concentration and the concentrations of alkali and/or alkaline earth oxides, alumina can be used to reduce liquidus temperature, thus enhancing liquidus viscosity and promoting compatibility with the fusion draw process. Like $SiO_2$, an increase in $Al_2O_3$ relative to the alkalis or alkaline earths generally results in decreased density, decreased coefficient of thermal expansion, and improved durability. $Al_2O_3$ plays an extremely important role in ion-exchangeable glasses since it enables a strong network backbone (i.e., high annealing point) while allowing for fast diffusivity of alkali ions. Thus the presence of $Al_2O_3$ hastens the kinetics of the ion-exchange process while promoting a high compressive stress. The main drawback of $Al_2O_3$ is that it also promotes the reaction of zircon into fusion line zirconia defects. For example, in terms of the $Z_i$ coefficients of Eq. (1), the zircon breakdown temperature decreases by nearly 25° C. for every mol % of $Al_2O_3$ added to the glass. Owing to this balance between improved melting/liquidus characteristics but decreased zircon breakdown temperature, in an embodiment, the $Al_2O_3$ content of a treatment glass is between 8 and 9.5 mol %.

Boron oxide, or $B_2O_3$, is also a glass-forming oxide, and is used to reduce viscosity and to reduce liquidus temperature. In general, an increase in $B_2O_3$ of 1 mol % decreases the temperature at equivalent viscosity by 10-14° C., depending on the details of the glass composition and the viscosity in question. However, $B_2O_3$ can lower liquidus temperature by 18-22° C. per mol %, and thus has the effect of decreasing liquidus temperature more rapidly than it decreases viscosity, thereby increasing liquidus viscosity. For treatment glasses, $B_2O_3$ can be useful in that it softens the glass network but with only minimal impact on zircon breakdown temperature (e.g., a decrease of only 3° C. per mol % $B_2O_3$ in terms of the $Z_i$ coefficients of Eq. (1)). Thus, $B_2O_3$ can be useful for improving melting performance without sacrificing the zircon breakdown behavior.

$B_2O_3$ is also the most effective oxide at reducing the density of the glass. Since tank transition times may be limited by density differences between the initial and final glasses (see above), the use of $B_2O_3$ to lower density may be of critical importance, depending on the specific application. However, $B_2O_3$ has a negative impact on ion-exchange performance, decreasing both diffusivity and compressive stress. In an embodiment, the $B_2O_3$ content of a treatment glass is between 0 and 2 mol %.

Alkali oxides ($Na_2O$ and $K_2O$) are also effective at reducing the melting temperature of the glass and reducing liquidus temperature. For ion-exchangeable glasses, the presence of a small alkali ion (such as $Na^+$) is necessary to exchange with a larger alkali ion (such as $K^+$) when immersed in a molten salt bath. A sufficiently high concentration of $Na_2O$ is necessary to produce a large compressive stress in the glass, since compressive stress is proportional to the number of alkali ions that are exchanged out of the glass. Thus, when an ion-exchangeable treatment glass is desired, $Na_2O$ needs to be included in the composition, even thought it will have a negative effect on the zircon breakdown temperature, e.g., a decrease of around 34.5° C. per mol % $Na_2O$ in terms of the 4 coefficients of Eq. (1). Also, $Na_2O$ improves melting behavior and lowers transition times. In an embodiment, the $Na_2O$ content of a treatment glass is between 13.5 and 14.5 mol %.

The presence of a small amount of $K_2O$ generally improves diffusivity. However, $K_2O$ can significantly compromise zircon breakdown temperature. For example, in terms of the $Z_i$ coefficients of Eq. (1), every mol % $K_2O$ added to the glass results in a loss of nearly 45° C. in $T_{brkdwn}$. This reduction in $T_{brkdwn}$ is larger than that associated with $Al_2O_3$, $B_2O_3$, $Na_2O$, MgO, and CaO. For this reason, $K_2O$ should be minimized in a treatment glass. In an embodiment, the $K_2O$ content of a treatment glass is between 0 and 0.05 mol %.

Like $Na_2O$, alkaline earth oxides improve the melting behavior of the glass but contribute negatively to the zircon breakdown temperature (e.g., the $Z_i$ coefficients of Eq. (1) for MgO and CaO are −12.6° C./mol % and −25.3° C./mol %, respectively). The negative impact of alkaline earth oxides on zircon breakdown performance is not as severe as that of the alkali oxides. With respect to ion-exchange performance, the presence of MgO and CaO acts to decrease alkali mobility. This effect is especially pronounced with CaO, and hence, in an embodiment, the CaO content of a treatment glass is between 0 and 0.1 mol %. MgO offers several advantages of alkaline earth oxides, including improved melting behavior and increased stress relaxation, while minimizing the adverse effects on alkali diffusivity. Moreover, MgO has only half the negative impact on zircon breakdown temperature compared to CaO. Accordingly, in an embodiment, the MgO content of a treatment glass is between 5 and 6.5 mol %.

$SnO_2$ is listed in Table 1 because it is often used as a fining agent in the fusion process. More $SnO_2$ generally equates to improved fining capacity, but as it is a comparatively expensive raw material, it is desirable to add no more than is required to drive gaseous inclusions to an appropriately low level. Also, $SnO_2$ has a negative effect on the zircon breakdown temperature. In an embodiment, the $SnO_2$ content of a treatment glass is between 0 and 0.3 mol %. Alternatively, $As_2O_3$ and/or $Sb_2O_3$ may be used as a fining agent. However these have the disadvantage of being toxic.

Table 1 also lists a representative range for $ZrO_2$ (zirconia). Zirconia serves no practical role in the melting or fining behavior of the glass, and imparts no interesting properties at such a low level; however it will often be introduced into glass compositions by contact of hot glass with zirconia-based refractory materials in the melter. Similarly, Table 1 also lists a representative range for $Fe_2O_3$ since it is a common impurity in commercial raw batch materials. In laboratory studies, including $ZrO_2$ and $Fe_2O_3$ at the levels of Table 1 can be useful in more closely simulating commercial production conditions.

Table 2 shows representative treatment compositions having component concentrations within the ranges of Table 1. These compositions can be used to treat a zircon isopipe prior to its use in the manufacture of ion-exchangeable glasses or when transitioning from one ion-exchangeable glass composition to another ion-exchangeable glass composition. The treatment compositions can also be used between two runs of the same ion-exchangeable glass composition to remove zirconia which may have accumulated on an isopipe during the first of the two runs.

In addition to component concentrations, Table 2 also lists various measured properties for the treatment compositions. The samples used to obtain these measured values were prepared by melting 4,000 gram batches of each glass composition at a temperature and time to result in a relatively homogeneous glass composition, e.g., at a temperature of about 1625° C. for a period of about 11 hours in platinum crucibles. In particular, the batch materials were ball-milled for one hour using ceramic media in a ceramic mill. The batch was transferred to two 1800 cc platinum crucibles and loaded into a furnace at 1625° C. After 5 hours, the crucibles were removed from the furnace and the glass was poured into a steel bucket with cold running water. The resulting cullet was remelted in a single 1800 cc platinum crucible for 6 hours, again at 1625° C. This crucible was then removed from the furnace and the glass poured onto a cold steel plate. When viscous enough to handle, the glass was transferred to an annealing oven at 630° C., held for one hour at this temperature, then cooled at 0.5° C./minute to room temperature.

The glass properties set forth in Table 2 were determined in accordance with techniques conventional in the glass art, specifically, in accordance with ASTM techniques. Thus, the linear coefficient of thermal expansion (CTE) over the temperature range 0-300° C. is expressed in terms of $\times 10^{-7}/°$ C. and the softening point, anneal point, and strain point are expressed in terms of ° C. These were determined from fiber elongation techniques. The density in terms of grams/$cm^3$ was measured via the Archimedes method. The melting temperature in terms of ° C. (defined as the temperature at which the glass melt demonstrates a viscosity of 200 poises) was calculated employing the Mauro-Yue-Ellison-Gupta-Allan (MYEGA) equation (see Mauro et al., (2009) Viscosity of glass-forming liquids. *Proc Nat Acad Sci*, 106:19780-19784) fit to high temperature viscosity data measured via rotating cylinders viscometry. The temperature corresponding to a viscosity of 35 kPoise was determined in the same way. The liquidus temperature of the glass in terms of ° C. was measured using the gradient boat liquidus method. This involves placing crushed glass particles in a platinum boat, placing the boat in a furnace having a region of gradient temperatures, heating the boat in an appropriate temperature region for 72 hours, and determining by means of microscopic examination the highest temperature at which crystals appear at the air and platinum interfaces and in the interior of the glass. The liquidus viscosity in kPoises was determined from the liquidus temperature and the MYEGA equation and coefficients. Young's modulus and shear modulus values in terms of Mpsi were determined using resonant ultrasonic spectroscopy techniques. Poisson's ratio values were calculated from the measured values of Young's modulus and shear modulus. The refractive index and stress optic coefficient (SOC) of the glass in nm/cm/MPa were determined through optical measurements. The zircon breakdown temperature in ° C. ($T_{brkdwn}$) was determined through a 168-hr hold of the glass in contact with zircon refractory in a furnace with a constant temperature gradient. The zircon breakdown temperature was the lowest temperature at which zirconia crystals were observed by microscopic examination in the glass at the zircon/glass interface. The corresponding zircon breakdown viscosity in kPoise ($\eta_{brkdwn}$) was determined using the MYEGA equation and coefficients.

Without intending to limit it in any manner, the invention will be further illustrated by the following example.

Example

Table 3 sets forth representative compositions of the major components of two ion-exchangeable glasses which are susceptible to fusion line zirconia defects when manufactured using the fusion process and a zircon isopipe.

The 1st Composition is run on a fusion draw machine until unacceptable levels of fusion line zirconia defects are observed. Thereafter, a transition is made to a treatment composition having the composition and properties of Glass 11 in Table 2, following which a transition is made to the 2nd Composition of Table 3. Glass 11 of Table 2 is designed to minimize the time involved in making the transition from the 1st Composition to the 2nd Composition and to clear the zircon isopipe of zirconia during the transition. Glass 11 is an ion-exchangeable glass and thus can be ion-exchanged strengthened and sold. Glass 11 is delivered to the isopipe at a viscosity of 35 kPoise and thus its $\Delta T_{brkdwn-delivery}$ and $\Delta \eta_{delivery-brkdwn}$ are 95 and 26, respectively.

The transition from the 1st Composition to the 2nd Composition is accomplished in a short amount of time, i.e., in less than six weeks, without an interruption in the operation of the glass making machine. The use of Glass 11 as the transition composition clears the zircon isopipe of high levels of zirconia accumulated during the use of the 1st Composition and thus glass sheets produced with the 2nd Composition after the treatment with Glass 11 are essentially completely free of fusion line zirconia defects.

From the foregoing, it can be seen that procedures have been provided for using a treatment glass composition (transition glass composition) to clean up defects, e.g., fusion line zirconia defects, resulting from interactions of molten glass with a zircon-containing forming structure, e.g., a zircon isopipe. This is accomplished by designing the treatment glass composition such that its zircon breakdown temperature is higher than the delivery temperature of the glass. Since the delivery temperature for a fusion process generally corresponds to a fixed shear viscosity in the range of 30-40 kPoise, this condition on breakdown temperature is equivalent to designing the treatment glass so that its zircon breakdown viscosity (i.e., the viscosity of the molten glass at its breakdown temperature) is less than the delivery viscosity of 30-40 kPoise.

Besides having a high zircon breakdown temperature (or, equivalently, a low zircon breakdown viscosity), in certain embodiments, the treatment glass composition is chosen to reduce the transition time between the starting and final glass compositions. Transition times are limited by the rate of density change, the rate of change in the delivery temperature, and the rate of compositional change. Hence, in accordance with these embodiments, the treatment glass is designed with values of these properties in mind to ensure a short transition time.

The advantages of the technology disclosed herein include some and preferably all of the following:

(1) The one or more treatment glasses clean the forming structure of zirconia defects, including fusion line zirconia defects in the case of the fusion process. Compared to a straight transition without using a treatment glass, the quality of the final production glass is improved.
(2) The one or more treatment glasses can be selected to reduce transition time between starting and final production glass compositions.
(3) The procedure of using one or more treatment glasses does not require a tank drain since glass can be manufactured continuously throughout.
(4) The one or more treatment glasses can themselves have properties suitable for sale, e.g., ion-exchangeability, so glass can continue to be sold during the transition.

The mathematical procedures of Eqs. (1) and (2) can be readily implemented using a variety of computer equipment and a variety of programming languages or mathematical computation packages such as MATHEMATICA (Wolfram Research, Champaign, Ill.), MATLAB (MathWorks of Natick, Mass.), or the like. Customized software can also be used. Output from the procedures can be in electronic and/or hard copy form, and can be displayed in a variety of formats, including in tabular and graphical form. For example, graphs of the types shown in FIGS. 2 and 3 can be prepared using commercially available data presentation software such as MICROSOFT's EXCEL program or similar programs. Software embodiments of the procedures described herein can be stored and/or distributed in a variety of forms, e.g., on a hard drive, diskette, CD, flash drive, etc. The software can operate on various computing platforms, including personal computers, workstations, mainframes, etc.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

TABLE 1

Exemplary Treatment Compositions

| Component (mol %) | Range |
|---|---|
| $SiO_2$ | 68-72 |
| $Al_2O_3$ | 8-9.5 |
| $B_2O_3$ | 0-2 |
| $Na_2O$ | 13.5-14.5 |
| $K_2O$ | 0-0.05 |
| MgO | 5-6.5 |
| CaO | 0-0.1 |
| $SnO_2$ | 0-0.3 |
| $Fe_2O_3$ | 0-0.08 |
| $As_2O_3$ | 0-0.5 |
| $Sb_2O_3$ | 0-0.5 |
| $ZrO_2$ | 0-0.08 |

TABLE 2

Exemplary Treatment Compositions

| | 1 | 2 | 3 | 4 | 5 |
|---|---|---|---|---|---|
| Component (mol %) | | | | | |
| $SiO_2$ | 70.09 | 69.68 | 69.49 | 71.54 | 68.08 |
| $Al_2O_3$ | 9.08 | 9.05 | 9.14 | 8.15 | 9.10 |
| $B_2O_3$ | 0.00 | 0.80 | 0.77 | 0.81 | 1.81 |
| $Na_2O$ | 14.31 | 14.05 | 14.13 | 14.07 | 14.26 |
| $K_2O$ | 0.01 | 0.01 | 0.01 | 0.01 | 0.01 |
| MgO | 6.23 | 6.14 | 6.18 | 5.15 | 6.47 |
| CaO | 0.07 | 0.05 | 0.05 | 0.05 | 0.05 |
| $SnO_2$ | 0.20 | 0.19 | 0.19 | 0.19 | 0.20 |
| $ZrO_2$ | 0.01 | 0.01 | 0.01 | 0.01 | 0.01 |
| $Fe_2O_3$ | 0.01 | 0.01 | 0.01 | 0.01 | 0.01 |
| Properties | | | | | |
| Anneal Pt (C.): | 649 | 634 | 635 | 620 | 616 |
| Strain Pt (C.): | 596 | 582 | 583 | 569 | 568 |
| Density (g/cm^3): | 2.43 | 2.429 | 2.43 | 2.421 | 2.432 |
| CTE (×10^-7/C): | 78.9 | 77.5 | 77.4 | 76.6 | 78.2 |
| Softening Pt (C.): | 891 | 872.4 | 873.7 | 858.1 | 846.1 |
| 72-h Air Liquidus (C.): | 1040 | 1030 | 1070 | 1025 | 1070 |
| 72-h Internal Liquidus (C.): | 1035 | 1030 | 1060 | 1025 | 1060 |
| 72-h Pt Liquidus (C.): | 1025 | 1030 | 1040 | 1020 | 1050 |
| Primary Devit Phase: | Forsterite | Forsterite | Forsterite | Forsterite | Forsterite |
| Zircon Brkdn Temp (C.): | 1250 | 1262 | 1256 | 1294 | 1245 |
| Zircon Brkdn Visc (kPoise): | 13.34 | 9.13 | 9.36 | 5.52 | 7.31 |
| T (200 Poise) (C.): | 1662 | 1651 | 1647 | 1657 | 1609 |

TABLE 2-continued

Exemplary Treatment Compositions

| | | | | | |
|---|---|---|---|---|---|
| T (35 kPoise) (C.): | 1186 | 1170 | 1167 | 1159 | 1138 |
| Liquidus Visc (Poise): | 633344 | 465744 | 236911 | 385241 | 136732 |
| Poisson's Ratio: | 0.214 | 0.213 | 0.208 | 0.212 | 0.217 |
| Shear Modulus (Mpsi): | 4.268 | 4.266 | 4.279 | 4.247 | 4.26 |
| Young's Modulus (Mpsi): | 10.367 | 10.352 | 10.34 | 10.29 | 10.367 |
| Refractive Index: | 1.5 | 1.5007 | 1.501 | 1.4989 | 1.5016 |
| SOC (nm/cm/MPa): | 29.6 | 29.94 | 29.94 | 29.97 | 30.03 |

| | 6 | 7 | 8 | 9 | 10 | 11 |
|---|---|---|---|---|---|---|
| Component (mol %) | | | | | | |
| $SiO_2$ | 69.53 | 69.75 | 69.99 | 69.89 | 69.95 | 70.44 |
| $Al_2O_3$ | 9.04 | 9.04 | 9.05 | 9.03 | 9.06 | 9.03 |
| $B_2O_3$ | 1.56 | 1.30 | 1.05 | 1.50 | 1.71 | 1.03 |
| $Na_2O$ | 13.93 | 14.02 | 14.00 | 14.07 | 13.97 | 14.00 |
| $K_2O$ | 0.01 | 0.01 | 0.01 | 0.01 | 0.01 | 0.01 |
| MgO | 5.65 | 5.62 | 5.63 | 5.25 | 5.04 | 5.21 |
| CaO | 0.06 | 0.06 | 0.06 | 0.05 | 0.05 | 0.05 |
| $SnO_2$ | 0.20 | 0.20 | 0.20 | 0.20 | 0.20 | 0.20 |
| $ZrO_2$ | 0.01 | 0.01 | 0.01 | 0.01 | 0.01 | 0.01 |
| $Fe_2O_3$ | 0.01 | 0.01 | 0.01 | 0.01 | 0.01 | 0.01 |
| Properties | | | | | | |
| Anneal Pt (C.): | 628 | 631 | 635 | 635 | 619 | 629 |
| Strain Pt (C.): | 578 | 581 | 583 | 575 | 571 | 579 |
| Density (g/cm³): | 2.426 | 2.425 | 2.426 | 2.423 | 2.423 | 2.423 |
| CTE (×10⁻⁷/C): | 77.3 | 77.4 | 77.9 | 77.3 | 76.8 | 77.9 |
| Softening Pt (C.): | 863.9 | 868.7 | 878.6 | 862.3 | 855.4 | 872.2 |
| 72-h Air Liquidus (C.): | 1010 | 990 | 980 | 975 | 960 | 980 |
| 72-h Internal Liquidus (C.): | 1010 | 985 | 980 | 970 | 960 | 980 |
| 72-h Pt Liquidus (C.): | 990 | 980 | 970 | 965 | 960 | 975 |
| Primary Devit Phase: | Forsterite | Forsterite | Forsterite | Albite | Albite | Albite |
| Zircon Brkdn Temp (C.): | 1269 | 1268 | 1269 | 1270 | 1274 | 1275 |
| Zircon Brkdn Visc (kPoise): | 6.65 | 8.36 | 8.98 | 7.94 | 6.82 | 9.20 |
| T (200 Poise) (C.): | 1630 | 1648 | 1655 | 1653 | 1648 | 1674 |
| T (35 kPoise) (C.): | 1152 | 1168 | 1175 | 1166 | 1158 | 1180 |
| Liquidus Visc (Poise): | 476497 | 1172629 | 1471368 | 1564070 | 1560263 | 1586765 |
| Poisson's Ratio: | 0.207 | 0.203 | 0.206 | 0.207 | 0.219 | 0.208 |
| Shear Modulus (Mpsi): | 4.267 | 4.274 | 4.263 | 4.242 | 4.239 | 4.21 |
| Young's Modulus (Mpsi): | 10.3 | 10.285 | 10.284 | 10.243 | 10.332 | 10.169 |
| Refractive Index: | 1.500435 | 1.50021 | 1.50013 | 1.49975 | 1.499905 | 1.499395 |
| SOC (nm/cm/MPa): | 30.16 | 30.12 | 30.02 | 30.27 | 30.35 | 30.12 |

TABLE 3

Exemplary Product Compositions

| Component (mol %) | 1st Composition | 2nd Composition |
|---|---|---|
| $SiO_2$ | 66.3 | 64.2 |
| $Al_2O_3$ | 10.5 | 14.0 |
| $B_2O_3$ | 0.5 | 7.0 |
| $Na_2O$ | 14.0 | 14.0 |
| $K_2O$ | 2.5 | 0.5 |
| MgO | 5.5 | 0.1 |
| CaO | 0.5 | 0.1 |
| $SnO_2$ | 0.2 | 0.1 |

What is claimed is:

1. A treatment process for treating a forming structure in preparation for producing glass sheets from molten glass having a production composition, said forming structure having an outer surface at least a part of which is composed of zircon and comes into contact with the molten glass during use of the forming structure, said treatment process comprising:

(A) melting batch materials to produce molten glass having a treatment composition, said batch materials comprising silica; and (B) delivering the molten glass having the treatment composition to the forming structure at a delivery temperature $T_{delivery/treatment}$;

wherein:

(i) at $T_{delivery/treatment}$, the treatment composition promotes the reaction:

$$ZrO_2 + SiO_2 \rightarrow ZrSiO_4; \text{ and}$$

(ii) the treatment process reduces the level of zirconia defects in glass sheets produced from the production composition using the forming structure.

2. The treatment process of claim 1 wherein:
(i) the treatment composition has a zircon breakdown temperature $T_{brkdwn/treatment}$;
(ii) the treatment composition has a $\Delta T_{treatment} = T_{brkdwn/treatment} - T_{delivery/treatment}$; and
(iii) $\Delta T_{treatment}$ satisfies the relationship:

$$\Delta T_{treatment} \geq 5° C.$$

3. The treatment process of claim 2 wherein $T_{brkdwn/treatment}$ is experimentally measured.

4. The treatment process of claim 2 wherein $T_{brkdwn/treatment}$ is calculated using an equation of the form:

$$T_{brkdwn/treatment} = T_{b0} + \Sigma x_i Z_i$$

where the $x_i$ are concentrations in mole percent of the oxide components of the treatment composition except for silica and $T_{b0}$ and the $Z_i$'s are fitting parameters.

5. The treatment process of claim 1 wherein:

(i) the treatment composition has a zircon breakdown temperature $T_{brkdwn/treatment}$;
(ii) the treatment composition has a $\Delta T_{treatment} = T_{brkdwn/treatment} - T_{delivery/treatment}$;
(iii) the production composition has a delivery temperature $T_{delivery/production}$;
(iv) the production composition has a zircon breakdown temperature $T_{brkdwn/production}$;
(v) the production composition has a $\Delta T_{production} = T_{brkdwn/production} - T_{delivery/production}$; and
(vi) $\Delta T_{treatment}$ and $\Delta T_{production}$ satisfy the relationship:

$$\Delta T_{treatment} > \Delta T_{production}.$$

6. The treatment process of claim 5 wherein $T_{brkdwn/treatment}$ and $T_{brkdwn/production}$ are experimentally measured.

7. The treatment process of claim 5 wherein $T_{brkdwn/treatment}$ and $T_{brkdwn/production}$ are calculated using an equation of the form:

$$T_{brkdwn} = T_{b0} + \Sigma x_i Z_i$$

where the $x_i$ are concentrations in mole percent of the oxide components of the treatment composition except for silica when $T_{brkdwn/treatment}$ is calculated, the $x_i$ are concentrations in mole percent of the oxide components of the production composition except for silica when $T_{brkdwn/production}$ is calculated, and $T_{b0}$ and the $Z_i$'s are fitting parameters which are the same for the calculation of $T_{brkdwn/treatment}$ and $T_{brkdwn/production}$.

8. The treatment process of claim 5 wherein $\Delta T_{treatment}$ and $\Delta T_{production}$ satisfy the relationship:

$$\Delta T_{treatment} - \Delta T_{production} > 5° C.$$

9. The treatment process of claim 1 wherein:
(i) the treatment composition has a viscosity $\eta_{delivery/treatment}$ at $T_{delivery/treatment}$;
(ii) the treatment composition has a zircon breakdown viscosity $\eta_{brkdwn/treatment}$; and
(iii) $\eta_{delivery/treatment}$ and $\eta_{brkdwn/treatment}$ satisfy the relationships:

$$30 \text{ kPoise} \leq \eta_{delivery/treatment} \leq 40 \text{ kPoise; and}$$

$$\eta_{brkdwn/treatment} \leq 30 \text{ kPoise}.$$

10. The treatment process of claim 1 wherein the batch materials used in step (A) are at least partially based on a computer-implemented model which relates zircon breakdown temperature to glass composition.

11. The treatment process of claim 10 wherein the computer-implemented model comprises estimating/predicting a zircon breakdown temperature $T_{brkdwn/treatment}$ for the treatment composition by evaluating an equation of the form:

$$T_{brkdwn/treatment} = T_{b0} + \Sigma x_i Z_i$$

where the $x_i$ are concentrations in mole percent of the oxide components of the treatment composition except for silica and $T_{b0}$ and the $Z_i$'s are fitting parameters.

12. The treatment process of claim 1 further comprising using the forming structure to produce a glass ribbon from the molten glass delivered to the forming structure in step (B) and separating glass sheets from said ribbon, said glass sheets having the treatment composition.

13. The treatment process of claim 12 wherein the treatment composition is ion-exchangeable.

14. The treatment process of claim 13 further comprising subjecting the glass sheets having the treatment composition to ion exchange.

15. The treatment process of claim 1 wherein steps (A) and (B) are repeated one or more times with a different treatment composition, or a different delivery temperature, or both a different treatment composition and a different delivery temperature, wherein each treatment composition/delivery temperature combination promotes the reaction:

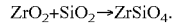

$$ZrO_2 + SiO_2 \rightarrow ZrSiO_4.$$

16. The treatment process of claim 1 wherein the treatment composition comprises in mole percent on an oxide basis:
$SiO_2$: 68-72
$Al_2O_3$: 8-9.5
$B_2O_3$: 0-2
$Na_2O$: 13.5-14.5
$K_2O$: 0-0.05
MgO: 5-6.5
CaO: 0-0.1
$SnO_2$: 0-0.3
$Fe_2O_3$: 0-0.08
$As_2O_3$: 0-0.5
$Sb_2O_3$: 0-0.5
$ZrO_2$: 0-0.08.

17. The treatment process of claim 1 wherein the forming structure is an isopipe of an overflow, downdraw, fusion process.

* * * * *